United States Patent

Levinstein et al.

[15] 3,657,090

[45] Apr. 18, 1972

[54] FERROELECTRIC POLING OF FILLED TUNGSTEN BRONZES

[72] Inventors: Hyman Joseph Levinstein, Berkeley Heights; Shobha Singh, Summit; Le Grand Gerard Van Uitert, Morris Township, Morris County, all of N.J.

[73] Assignee: Bell Telephone Laboratories, Incorporated, Murray Hill, N.J.

[22] Filed: Jan. 22, 1970

[21] Appl. No.: 4,913

[52] U.S. Cl. .............................................204/164, 252/62.9

[51] Int. Cl. .......................................................C04b 35/00

[58] Field of Search.................................252/62.9; 204/164

[56] References Cited

UNITED STATES PATENTS 3,422,018 1/1969 Belloc..................................252/62.9

3,423,686 1/1969 Ballman...............................252/62.9

3,437,597 4/1969 Belloc..................................252/62.9

OTHER PUBLICATIONS

Ferroelectric Compounds by Burns et al., IBM Technical Disclosure Bull. Vol. 10, No. 5 p. 618 Oct. 1967

*Primary Examiner*—F. C. Edmundson
*Attorney*—R. J. Guenther and Edwin B. Cave

[57] ABSTRACT

Poling of ferroelectric tungsten bronze-like crystalline material in which the cation sites are substantially filled is expedited by electrolysis at temperatures in excess of the ferroelectric Curie temperature for periods of the order of one hour for bodies one centimeter in length. Electrolysis is carried out in an atmosphere which will yield positive ions such as $H^+$, $D^+$ and $Li^+$ which migrate through the body during processing.

8 Claims, 1 Drawing Figure

PATENTED APR 18 1972 3,657,090
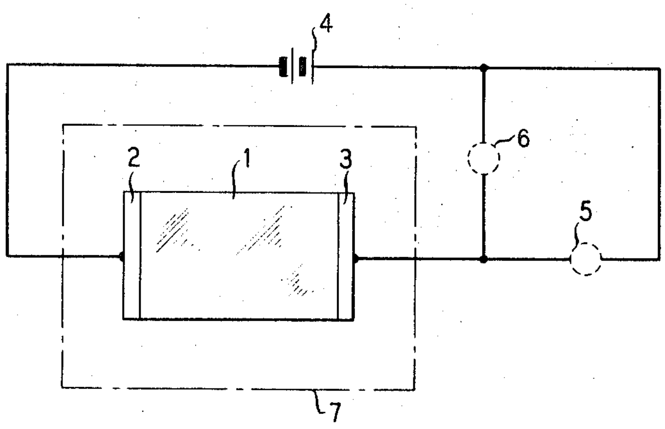
INVENTORS: H. J. LEVINSTEIN
S. SINGH
L. G. VAN UITERT
BY: George S. Indig
ATTORNEY

FERROELECTRIC POLING OF FILLED TUNGSTEN BRONZES

BACKGROUND OF THE INVENTION

1. Field of the Invention

The invention is concerned with the processing of filled ferroelectric tungsten bronze-like materials such as $Ba_4Na_2Nb_{10}O_{30}$. Single crystal forms of many of the included members are useful in optical elements-some as linear electro-optic materials, some as nonlinear frequency doublers and parametric devices.

2. Description of the Prior Art

Review of Pure and Applied Chemistry, Vol. 5, 165 (195S) and Materials Research Bulletin, Vol.3, 47–58 (1968) describe a family of materials which have a substantially tetragonal tungsten bronze-like structure and are ferroelectric. While such materials are of considerable interest in a number of uses, primary interest, at this time, centers about their use as optical materials. Included members, e.g., barium sodium niobate ($Ba_4Na_2Nb_{10}O_{30}$), are among the most promising nonlinear and/or linear (electro-optic) materials now under consideration for use in optical systems.

The most promising of the included materials have structures in which the cation sites are substantially filled. Essentially all of the cation sites in such structures (four A sites and two B sites per unit cell) are populated. Such filled compositions are considered particularly significant in that they are resistant to radiation damage. Radiation damage which takes the form of induced local refractive index inhomogeneities has been a deterrent in the development of certain other optical materials, notably lithium niobate.

For many purposes, it is recognized that materials of the type described are desirably single domain. This is, of course, a requirement for polycrystals intended for piezoelectric use. In optical use, the presence of domain walls scatters light and may render the material useless.

It has been recognized for some time that domain walls may be removed by ferroelectric poling—the process which involves subjugation to an applied voltage for a short period of time at temperatures at which the material manifests spontaneous polarization. Since required voltages diminish as the Curie temperature is approached, poling is most efficiently carried out at temperatures immediately below the ferroelectric Curie temperature. It is commercial practice to apply voltage immediately above the Curie temperature and to cool fairly rapidly through this transition. In common ferroelectric materials, it is also possible to carry out the poling operation at temperatures substantially below the Curie temperature, e.g., 50° C. below, for somewhat longer periods, perhaps of the order of several hours per centimeter of length.

For reasons which were not previously understood, poling of the tungsten bronzes has involved long time periods. Typically, barium sodium niobate crystals have required days to pole under usual conditions.

SUMMARY OF THE INVENTION

Ferroelectric poling of "filled" materials of tungsten bronze structure (hereafter referred to simply as "filled tungsten bronzes") is expedited by electrolysis at temperatures substantially above the ferroelectric Curie temperature. The mechanism involves diffusion of positively charged ions through the body being electrolyzed. An exemplary ion is $H^+$ which may be produced by the electrolysis of water vapor from an ordinary air atmosphere. Treatment times are characteristically one or a few hours for a body one centimeter of length at temperatures of the order of 600° C and above. After such treatment, ferroelectric poling is accomplished virtually instantaneously either in a separate processing step or simply by cooling through the Curie temperature while maintaining the electric field. Electric field values are not unusual.

BRIEF DESCRIPTION OF THE DRAWING

The FIGURE is a schematic representation of a filled tungsten bronze body undergoing processing in accordance with the invention.

DETAILED DESCRIPTION

1. The Drawing

In accordance with the FIGURE, body 1 which may be single or polycrystalline is provided with electrodes 2 and 3 by means of which the body is made part of a series circuit including d.c. source 4 and, optionally, ammeter 5 and voltmeter 6. The temperature of body 1 is maintained at the required level by means of furnace 7 within which the requisite atmosphere is contained.

2. Included Materials

Crystallographically concerned materials are of the approximate structure indicated by the spaced and point group P4 bm($c_{4v}^2$). materials of concern are ferroelectric at a finite temperature and are substantially tetragonal. For these purposes, substantially tetragonal indicates a rectilinear system in which the two axes, A and B, are substantially equal (within the ratio of from 0.96 to 1.04) and either one of these axes is approximately three times the length of the C axis. A typical cell may thereby be regarded as an array of nine Perovskite-like cells 3 by 3 by 1.

Within the unit cell there are four large pentagonal cation sites (A sites), two medium square cation sites (B sites), and four small triangular sites (C sites). There are ten niobium-containing octahedra per cell.

Within the broad class, only filled structures are considered of significance from the standpoint of the invention. Filled structures are defined as those in which the A sites and the B sites are at least 90 percent populated. Exemplary materials are: $Ba_4Na_2Nb_{10}O_{30}$, $(Ba,Sr)_4Na_2Nb_{10}O_{30}$, and $Sr_4K_2Nb_{10}O_{30}$. A more specific filled structure sometimes referred to as a "-completely filled" structure also has populated C sites. C sites are generally occupied by lithium, and this ion is usually included only where valence balancing so requires. For example, when divalent ions occupying the A sites are replaced in part or in whole by monovalent ions, lithium may be used to balance the compound. Exemplary materials are: $K_6Li_4Nb_{10}O_{30}$, $Na_6Li_4Nb_{10}O_{30}$, $K_4Na_2Li_4Nb_{10}O_{30}$.

The materials described above are exemplary only. Variations may include mixtures of two or more of any of the named members as well as compositions in which niobium is replaced in whole or in part by tantalum. Other substitutions are permissible providing the listed requirements are met.

While for optical purposes it is generally required that materials processed in accordance with the invention be single crystals, the invention, since it expedites ferroelectric poling, is not so limited. Polycrystalline materials benefit in the same manner as single crystals, and poled bodies may usefully serve as piezoelectric elements as in transducers, etc.

3. Processing Conditions

Electrolysis is desirably carried out at temperatures of at least 600° C. At this temperature, times of the order of one hour per centimeter are required for a body having a dimension of about one centimeter between electrodes. This time, which is based on a minimal voltage gradient of about 100 volts per centimeter of crystalline body, decreases as temperature is increased. The maximum temperature, however, is of the order of 1000° C above which the body is excessively conducting. This upper temperature is, however, tolerable only for ions other than $H^+$ and the ions of the hydrogen isotopes, deuterium and tritium. Where such light ions are used, the maximum temperature is 750° C since such ions are driven out above this limit. $H^+$ and related ions are preferred from the standpoint of the invention by reason of simplicity of processing. In fact, substantial $H^+$ is yielded from electrolysis of a small amount of water vapor present in an air atmosphere. Among the heavier ions, $Li^+$ is suitable and larger ions ($Pt^+$, $Ag^+$, $Au^+$, $Na^+$, $Tl^+$, etc.) may also be used although lower migration rates give rise to the need for longer electrolysis time.

Suitable voltage gradients range from 100 volts per centimeter to 2000 volts per centimeter. Below the minimum, treatment times become excessively long and above the maximum, arcing and excessive Joule heating may be a problem. A preferred range is from 150 volts per centimeter to about 500 volts per centimeter. A nominal voltage of about 200 volts per centimeter was used in much of the experimental work reported herein.

While the inventive process primarily contemplates the procedure set forth above, the objective is to expedite poling. Poling may, of course, be carried out as an entirely separate subsequent procedure. It is contemplated, however, that most expeditious processing will include poling as an additional step immediately subsequent to high temperature electrolysis. In such event, all that is required is to maintain the voltage gradient while cooling the crystal to below its Curie point. In either event, time of exposure below the Curie point is not critical.

4. Results

The listed compositions are exemplary of those which have been processed in accordance with the invention. Treated materials were determined to be single domain subsequent to poling by observing the maker oscillations in the second harmonic intensity due to the nonlinear coefficient $d_{33}$. Completion of processing could be observed by movement of a refractive index boundary across the body from the positive electrode to the negative electrode. In addition to expediting ferroelectric poling, it was observed that the electronic resistivity of the material was increased. For example, with barium sodium niobate, the increase was of the order of $10^3$ ohms. A resistivity increase is of device significance particularly for electro-optic use.

5. Mechanism

It is postulated that the electric field imposed results in the injection of protons or other positive charged particles at the positive electrode. It is believed that electrons are trapped at vacancies or other defects in the crystal leaving sites with uncompensated charges. Such negative charges trapped in the crystal inhibit polarization reversal. The positively charged particles diffused in apparently fall within or associate with the traps containing excess negative charges thus facilitating polarization reversal.

What is claimed is:

1. Process for treating a ferroelectric crystalline body of the space group and point group designations P4bm($C_{4v}^2$), said structure being defined by three rectilinear axes the length of two of which are related by the ratio of from 0.96 to 1.04 and the third of which is approximately one-third as great as either of the first two, in which the A and B crystallographic sites are at least 90 percent occupied, comprising electrolyzing said body at a voltage of from 100 volts per centimeter to 2000 volts per centimeter, characterized in that the said body is maintained at a temperature of at least 600° C during said electrolysis and in that the environment in contact with said body is such as to yield positive ions capable of migrating through said body.

2. Process of claim 1 in which the temperature range is from 600° C to 750° C and the positive ion is at least one ion selected from the group consisting of $H^+$, $D^+$ and $T^+$.

3. Process of claim 2 in which the said atmosphere is air.

4. Process of claim 1 in which the temperature range is from 600° C to 1000° C and the said ion is $Li^+$.

5. Process of claim 1 in which the said body is a single crystal.

6. Process of claim 1 in which the composition of said body consists essentially of a composition selected from the group consisting of $Ba_4Na_2Nb_{10}O_{30}$, $(Ba,Sr)_4Na_2Nb_{10}O_{30}$, $Sr_4K_2Nb_{10}O_{30}$, $K_6Li_4Nb_{10}O_{30}$, $Na_6Li_4Nb_{10}O_{30}$, $K_4Na_2Li_4Nb_{10}O_{30}$, any of the foregoing containing partial substitution of Ta for Nb, and mixtures thereof.

7. Process of claim 6 in which the said composition consists essentially of $Ba_4Na_2Nb_{10}O_{30}$.

8. Process of claim 1 in which the said body is subsequently reduced in temperature to below its ferroelectric Curie temperature while maintaining an electric field across the said body.

* * * * *